United States Patent [19]

Asahi et al.

[11] Patent Number: 5,793,948
[45] Date of Patent: Aug. 11, 1998

[54] METHOD AND APPARATUS FOR RECORDING AND ANALYZING AN INTERACTION LOG

[75] Inventors: Toshiyuki Asahi; Hidehiko Okada, both of Tokyo, Japan

[73] Assignee: NEC Corporation, Tokyo, Japan

[21] Appl. No.: 563,004

[22] Filed: Nov. 27, 1995

[30] Foreign Application Priority Data

Nov. 25, 1994 [JP] Japan .................. 6-315772

[51] Int. Cl.$^6$ ............................... G06F 11/34
[52] U.S. Cl. ................... 395/184.01; 395/183.21
[58] Field of Search ................. 395/184.01, 336, 395/337, 339, 326, 183.15, 183.21; 345/162

[56] References Cited

U.S. PATENT DOCUMENTS

| | | | |
|---|---|---|---|
| 3,582,901 | 6/1971 | Cochrane et al. | 395/184.01 |
| 5,321,829 | 6/1994 | Zifferer | 395/184.01 |
| 5,513,308 | 4/1996 | Mori | 395/155 |
| 5,564,005 | 10/1996 | Weber et al. | 395/161 |
| 5,590,056 | 12/1996 | Barritz | 395/184.01 |
| 5,621,434 | 4/1997 | Marsh | 345/145 |

FOREIGN PATENT DOCUMENTS 5233378  9/1993  Japan ................. 395/184.01

OTHER PUBLICATIONS

Urlocker, Zack; Object–Oriented Programming for Windows; Byte Magazine May 1990; pp. 287–294.
Mazumdar et al.; Monitoring Integrated Networks for Performance Management; IEEE 1990; pp. 289–294.

T. Asahi et al., "UI–Tester: A tool for Computer Aided Usability Testing"; 7th Symposium on Human Interface, Oct. 23–25, 1991, pp. 1–4.

N. Kishi; "Automatic Analysis of User Operation Records with Multi–Step Matching"; Information Processing Institute 92–HI–41, Mar. 1992, pp. 77–84.

*Primary Examiner*—Robert W. Beausoliel, Jr.
*Assistant Examiner*—Scott T. Baderman
*Attorney, Agent, or Firm*—Whitman, Curtis & Whitham

[57] ABSTRACT

An apparatus for recording an interaction log includes an event detector for determining whether a reference event occurred in an interactive system. A state detector detects a parameter indicating a state of the interactive system when the event detector determined that the reference event occurred. A recorder records the parameter detected by the state detector. A latching mechanism latches information to be transferred from an input unit to a processing unit so that the processing unit does not respond to the reference event. A judging mechanism releases the information latched by the latching mechanism when the state detector completes detection. Thus, the state detector detects the parameter in synchronization with occurrence of the reference event. The apparatus also may include a plurality of imaging units and a controller. Each of the imaging units generates an image including graphical items corresponding to reference events recorded in the recorder. The controller receives information designating one of the reference events as a selected event, The controller directs the plurality of imaging units to mark a graphical item that corresponds to the selected event.

24 Claims, 11 Drawing Sheets

INTERACTION HISTORY BLOCK 1:
- 21 — \<EVENT\>   MENU_SELECT
- 22 — \<CURSOR\>  (100, 122)
- 23 — \<BUTTON\>  RIGHT_DOWN
- 24 — \<OBJECT\>  (MENU2, ITEM3)
- 25 — \<WINDOW\>  W1(10, 20, 100, 100), W2(50, 250, 600, 400)
- 26 — \<CURRENT\> W1
- 27 — \<TIME\>    00:15:23
- 28 — \<OBJ_NO\>  15
- 29 — \<CHAR_NO\> 632

INTERACTION HISTORY BLOCK 2:
- 21 — \<EVENT\>   WINDOW_CLOSE
- 22 — \<CURSOR\>  (356, 820)

METHOD AND APPARATUS FOR RECORDING AND ANALYZING AN INTERACTION LOG

BACKGROUND OF THE INVENTION

The present invention relates to an apparatus for recording and analyzing an interaction log.

In this specification, "interaction log" refers to a log of user operations performed for an interactive system.

This kind of apparatus is used for evaluating and improving the usability of an interactive system. The interactive system responds to the user operations, and the user operates the system according to the response of the system. For example, in the case of a system having a graphical user interface, the system displays images (e.g., menus or icons), the user operates (e.g., "clicks" on the icon) according to the image displayed, and the system displays another image (e.g., a lower level menu) in response to the user operation.

One example of a conventional apparatus is disclosed in "7th Human Interface Symposium", October, 1991, pp. 1–4, and Japanese Unexamined Patent Publication 233378/93. This conventional apparatus detects specific events (e.g., input signals, hereinafter "reference events") and records the reference events as the user operations. This conventional apparatus generates an image illustrating a relationship between the system responses and the user operations in a format of a transitional graph. Specifically, the system responses are represented as nodes, and the user operations are represented as arcs between the nodes.

Another conventional apparatus is disclosed in "Automatic Comparison on User's Operation Record by Multi-Step Difference Generation" Research Report by Information Processing Institute 92-HI-41, pages 77 to 84, March 1992. This conventional apparatus records messages. The messages are information representing the user operations or the system responses. The messages of this apparatus correspond to the reference events of the aforementioned apparatus. This conventional apparatus detects differences between a model operation and an actual operation recorded. The information representing the difference is screened to eliminate needless information.

As stated above, the conventional apparatuses record only the reference events.

For example, when the reference events include an event to open a "window", the apparatus records the event to open the window, whereas the apparatus does not record other information such as the location of the cursor and other windows displayed simultaneously. Without these kinds of information, it is difficult to know the situations in which the user operations were performed.

In addition, the aforementioned conventional systems generate images showing the user operations in a format of a transitional graph or text data. However, when the user operations are complex, it is difficult to grasp overall operations simply by viewing the transitional graph or text data.

SUMMARY OF THE INVENTION

In view of the aforementioned problems, one object of the present invention is to record information along with the reference events. The information is recorded in synchronism with the occurrence of the reference events.

Another object of the present invention is to generate images showing the user operation in a novel format different from the transitional graph or the text data.

Yet another object of the present invention is to show the relationship among a plurality of images.

According to the present invention, an apparatus is provided for recording an interaction log of an interactive system. The interactive system includes an input unit, an output unit, and a processing unit coupled to the output unit.

The apparatus includes event detecting means, state detecting means, and recording means. The event detecting means determines whether an event occurred in the interactive system. The state detecting means detects a parameter indicating a state of the interactive system when the event detecting means determined that the event occurred. The recording means records the parameter detected by the state detecting means.

The event may comprise a reference event. The state detecting means may detect the parameter in synchronization with occurrence of the reference event.

The apparatus may include latching means and judging means. The latching means latches information to be transferred from the input unit to the processing unit so that the processing unit does not respond to the reference event. The judging means releases the information latched by the latching means when the state detecting means completes detection.

The apparatus may comprise a plurality of state detecting means. The judging means may release the information latched by the latching means after all of the plurality of state detecting means complete detection.

The apparatus may comprise a plurality of imaging units and a controller. Each of the imaging unit generates an image including graphical items corresponding to reference events recorded in the recording means. The controller receives information designating one of the reference events as a selected event. The controller directs the plurality of imaging units to mark a graphical item that corresponds to the selected event.

The apparatus may also comprise an imaging unit for generating an image including a graphical item corresponding to one of a plurality of reference events. The imaging unit may calculate one of x-coordinate and y-coordinate values of a position of the graphical item according to a window in which the reference event corresponding to the graphical item occurred. The imaging unit may calculate another coordinate value according to a time when the reference event corresponding to the graphical item occurred.

The imaging unit generates a different type of graphical symbol as the graphical item according to a kind of the reference event corresponding to the graphical item.

The apparatus may comprise an imaging unit for generating an image including a shape whose height represents a cumulative sum of a physical event.

The apparatus also may comprise an application program registering unit and an application program detecting unit. The application program registering unit registers a type of application program whose reference events are to be recorded. The application program detecting unit directs the recording means to record the parameter when the reference event was produced by an application program that is registered in the application program registering unit.

The recording means may record a plurality of data blocks each corresponding to one of a plurality of reference events. The recording means may record the parameter which was detected in synchronization with a first reference event into one of the data blocks corresponding to a second reference event which occurred subsequent to the first reference event.

The apparatus may comprise an imaging unit for generating an image including nodes each corresponding to one of a plurality of reference events. The imaging unit calculates a position of the node according to a cursor position at a time when the reference event occurred. The imaging unit may generate an image having vectors connecting the nodes.

The apparatus may comprise an imaging unit for generating an image including vectors. Each of the vectors represents cursor movement between successive ones of reference events. The vectors are positioned so that the vectors have a same origin.

BRIEF DESCRIPTION OF THE DRAWINGS

Other objects, features and advantages of the present invention will become more apparent when the following description is read in conjunction with the accompanying drawings, wherein:

FIG. 3 is an interaction log recorded in a recorder 104;

In these drawings, the same reference numerals depict the same parts, respectively.

DETAILED DESCRIPTION OF THE PREFERRED EMBODIMENTS

Figure 1:
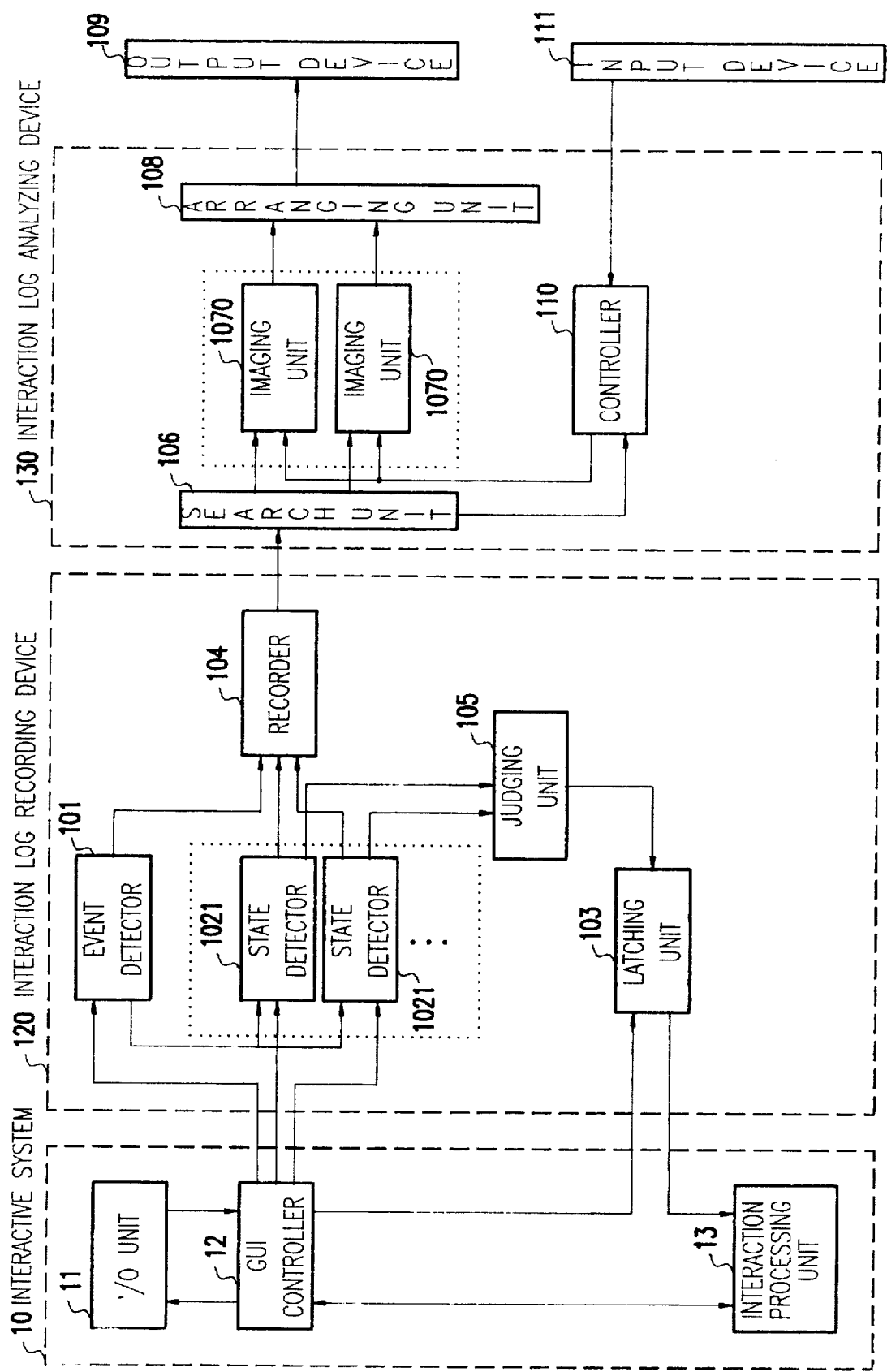
FIG. 1 is a schematic block diagram of an apparatus according to a first embodiment of the present invention.

Referring to FIG. 1, an apparatus according to the first embodiment of the present invention includes an interaction log recording device 120 and an interaction log analyzing device 130.

The interactive system 10, the interaction log of which is to be recorded, includes an input/output unit 11 (hereinafter referred to as an "I/O unit"), a graphical user interface controller 12 (hereinafter referred to as "GUI controller"), and an interaction processing unit 13.

The I/O unit 11 includes an input device (e.g., a mouse, a trackball, a touch panel, a light pointer, or a keyboard or the like) and an output device (e.g., a cathode-ray-tube or a liquid crystal display). The operator operates the interactive system 10 through the I/O unit 11. When an input event (e.g., user operations for interactive objects, user operations to create a window, input of character data, or the like), the I/O unit 11 posts the occurrence of the event to the GUI controller 12 by sending information (e.g., a message) to the GUI controller 12.

The GUI controller 12 manages windows and various interactive objects (menus, buttons, or icons) which are displayed by the I/O unit 11. When the input event occurs, the GUI controller 12 receives the information from the I/O unit 11. The GUI controller 12 processes the information and sends the. information to an interaction processing unit 13. Thus, the occurrence of the event is posted to the interaction processing unit 13.

The interaction processing unit 13 performs a required process in response to the event posted. Thereafter, the interaction processing unit 13 sends the response thereof to the I/O unit 11 via the GUI controller 12. The I/O unit 11 displays the response from the interaction processing unit 13.

The interaction log recording device 120 includes an event detector 101. The event detector 101 receives information from the GUI controller 12 and detects the occurrence of an input event. When the occurring event is a type of event to be recorded, (hereinafter "reference events"), the event detector 101 posts the occurrence of the reference event to state detectors 1021 and a recorder 104 by sending information (e.g., a message or a trigger signal) thereto.

The reference events can be programmed by the operator. The reference events preferably include events describing the development of user-machine interaction. Such reference events include, for example, operations for interactive objects, operations to create/move/enlarge/delete a window, input of character data or the like as determined by the designer. The reference events may also include mouse movement represented by dots on the output screen or other events produced by activating the mouse.

Upon receiving the information from the event detector 101, each of the state detectors 1021 obtains an interactive state is parameter assigned thereto from the GUI controller 12. Thus, a plurality of interactive state parameters are obtained simultaneously in synchronization with the occurrence of the reference event. The state detectors 1021 send the interactive state parameters to the recorder 104.

Interactive state parameters are, for example, states of the objects within a screen, positions of an input device (e.g., mouse) cursor, operation time, and states of windows. The types of interactive state parameters to be acquired are programmed according to the operator's needs.

The recorder 104 stores or records the interactive state parameters sent from the state detectors 1021 along with information indicative of the reference event that triggered the acquisition of the parameters.

The synchronization of the parameter acquisition is secured, by a judging unit 105 and a latching unit 103. The interactive state parameters must be collected before the interaction processing unit 13 responds to the reference event. Otherwise, the response of the interaction processing unit 13 would alter or disturb the interactive state parameters. For example, the interactive state parameters would likely be altered or disturbed when a relatively long time was necessary to obtain many parameters. However, the judging unit 105 and the latching unit 103 prevent this malfunction by temporarily suspending information transmission from the GUI controller 12 to the interaction processing unit 13.

Specifically, when a reference event occurs, the latching unit 103 latches the information sent from the GUI controller 12 so that the occurrence of the reference event is not posted to the interaction processing unit 13. The judging unit 105 monitors the state detectors 1021 and sends information (e.g., a message or a trigger signal) to the latching unit 103 when all the state detectors 1021 complete parameter acquisition.

Upon receiving the information from the judging unit 105, the latching unit 103 releases the information latched therein. Thus, all the interactive state parameters are acquired before the interactive state parameters are altered by the response from the interaction processing unit 13.

The operation of the judging unit 105 and latching unit 103 may be modified in the following manner. First, the judging unit 105 may send the information to release the latching unit 103 when a specific one or ones of the interactive state parameters have been acquired. Such interactive state parameters may include, for example, a parameter that needs the relatively longest time to be acquired and a parameter that may cause a critical error unless it is acquired before the interactive processing unit 13 responds. Second, the latching unit 103 may not latch the information when the reference event is a type of event that does not alter the interactive state parameters.

Next is described the operation of the interaction log recording device 120.

Figure 2:
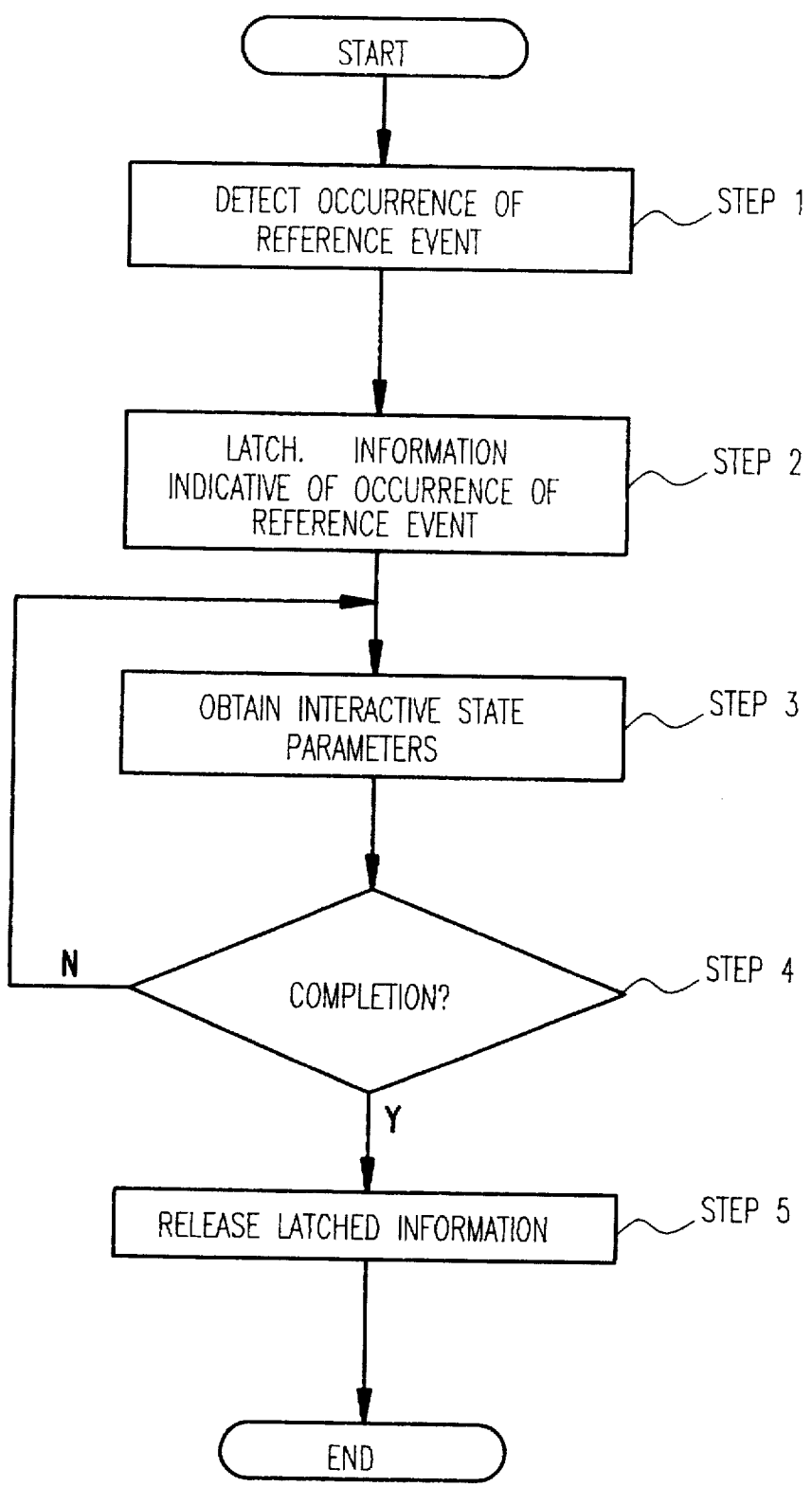
FIG. 2 is a flowchart illustrating the operation of an interaction log recording device 120.

Referring to FIG. 2, in step 1, the event detector 101 detects the occurrence of a reference event. In step 2, the judging unit 105 posts the occurrence of the reference event to the latching unit 103. The latching unit 103 latches the information indicative of the occurrence of the reference event to prevent the interaction processing unit 13 from responding to the reference event. In step 3, the state detectors 1021 obtain the interactive state parameters. In step 4, the judging unit 105 determines whether all the parameters are acquired or not. In step 5, when all the parameters are acquired, the latching unit 103 releases the information latched therein.

Next are described the structure of the interaction log recorded by the interaction log recording device 120.

Referring to FIG. 3, the interaction log includes a plurality of blocks each corresponding to a reference event. The block is referred to as "an interaction history block." When a reference event occurs, an interaction history block is recorded. Each interaction history block includes portions to record corresponding reference event 21. The interactive history block also includes portions to record the interactive state parameters obtained in synchronization with the occurrence of the reference event 21. In this exemplary embodiment, included are a "cursor position" portion 22, a "mouse button state" portion 23, a "selected object" portion 24, a "windows on screen and position thereof" portion 25, an "operation object window" portion 26, "operation time" portion 27, a "number of interactive objects on screen" portion 28, and a "number of character on screen" portion 29. Each of these portions records an interactive state parameter described by the name thereof mentioned above.

Development of the user-machine interaction can be obtained by tracing the interactive state parameters in chronological order. For example, a cursor travel distance can be obtained by tracing the "cursor position" portion 22. The positional relationship (e.g., partial or complete overlaying, or overlapping relationship) among windows on screen can be obtained by tracing the "windows on screen and positions thereof" portion 25.

Next is described the structure and the operation of the interaction log analyzing device 130.

Referring again to FIG. 1, the interaction log analyzing device 130 includes a searching unit 106. The searching unit 106 extracts information from the interaction log in the recorder 104 according to requests from image generator 107.

The image generator 107 includes a plurality of imaging units 1070. The imaging units 1070 produce images illustrating the interaction log in different formats. The imaging units 1070 obtain needed information via the searching unit 106. The details of the imaging units 1070 are described below.

Images generated by the imaging units 1070 are sent to an arranging unit 108. The arranging unit 108 arranges the plurality of images produced by the imaging unit 107 in a screen. The images arranged by the arranging unit 108 are displayed by the output device 109 (e.g., a cathode-ray-tube or a liquid crystal display).

The operator can easily visualize and understand the relationship among the images in a screen by providing an instruction to a controller 110 through an input device 111. For example, the operator selects an item (e.g., a bar in a bar chart) in an image. The controller 110 determines a reference event that corresponds to the selected item. The controller 110 posts the selected reference event to the imaging units 1070. The imaging units 1070 mark (e.g., highlights or flashes) the items in other images that correspond to the selected event. Thus, the operator can easily grasp the relationship among the images in the screen. Details of the controller 110 are described below.

Next are described the structure and the operations of the imaging unit 1070.

Figure 4:
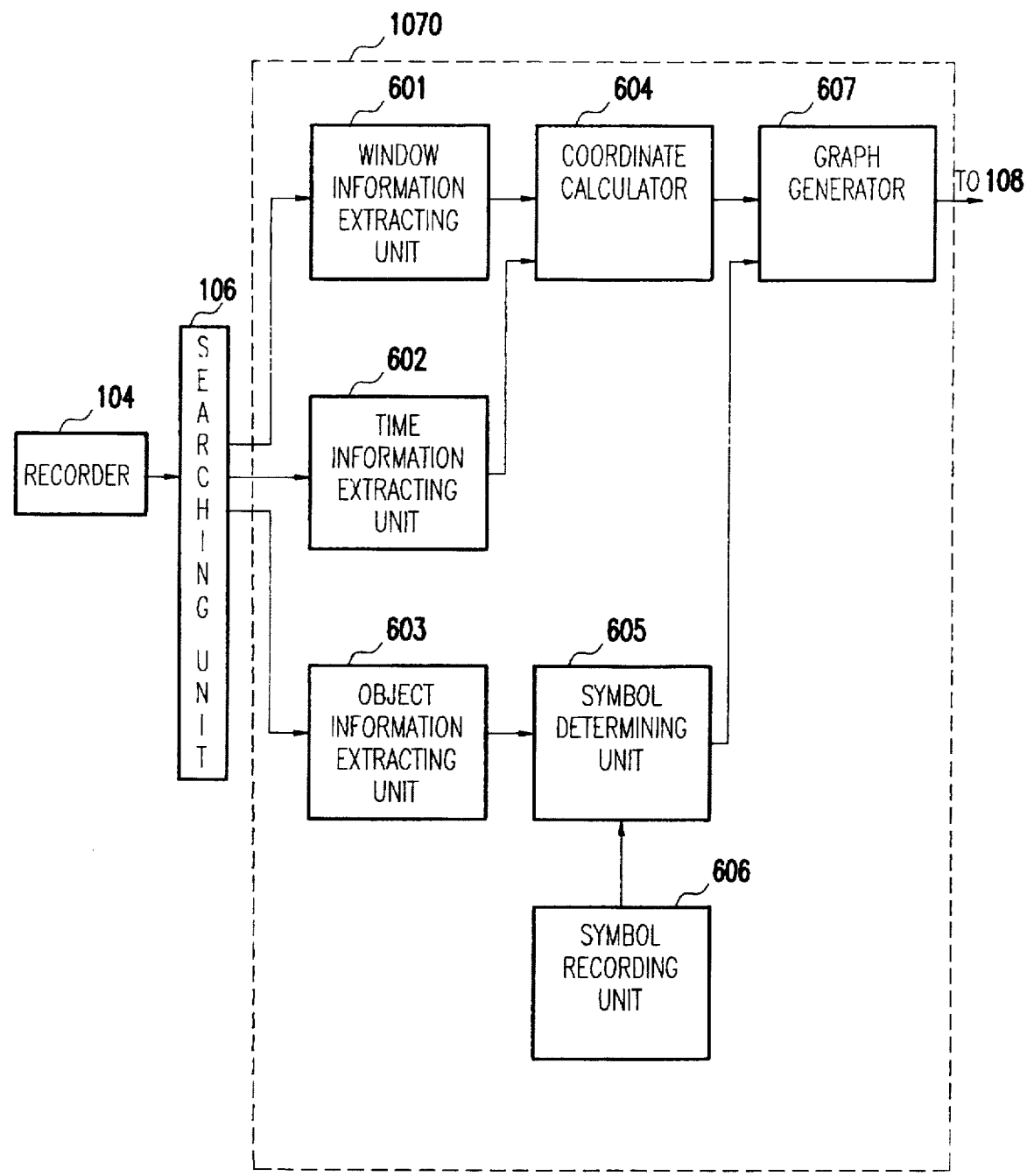
FIG. 4 is a schematic block diagram of an imaging unit 1070.
Figure 5:
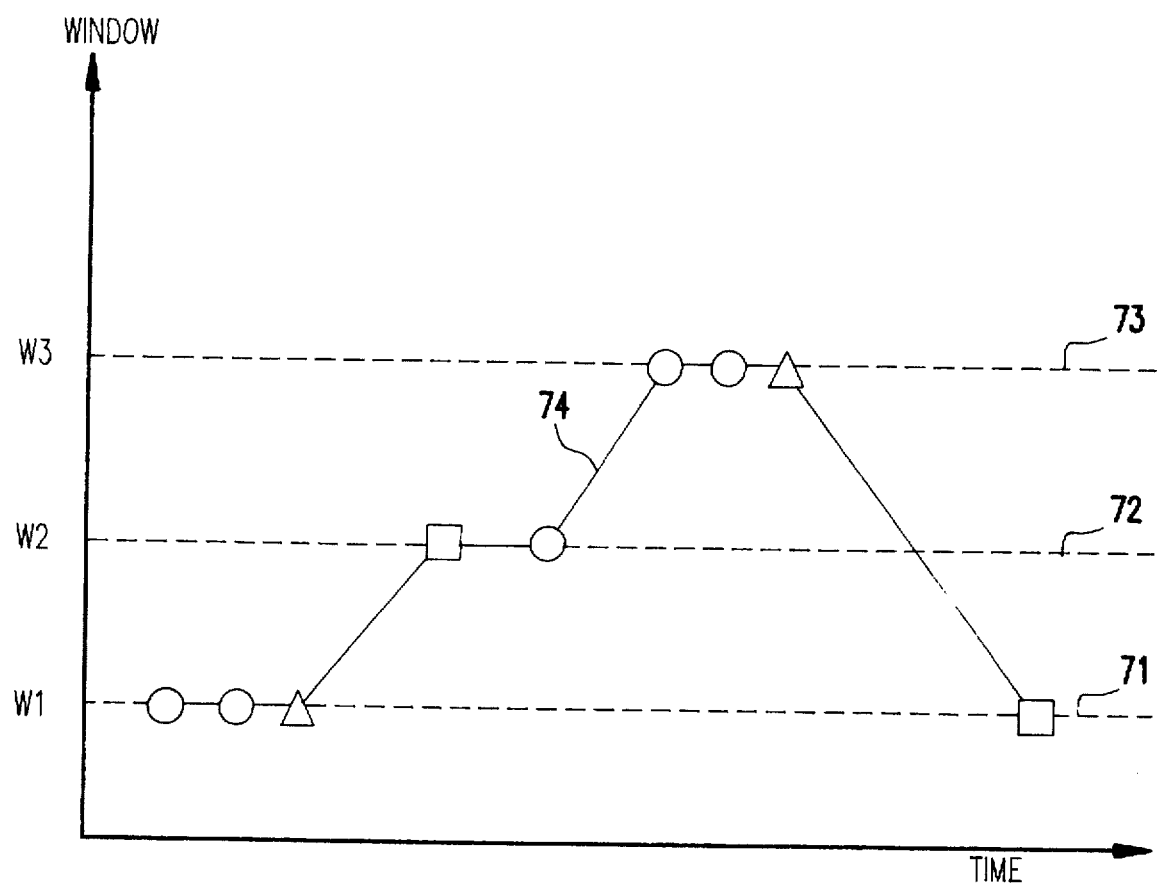
FIG. 5 is an example of an image generated by the imaging unit 1070 shown in FIG. 4.

Referring to FIGS. 4 and 5, the imaging unit 1070 for generating a graph depicted in FIG. 5, includes a window information extracting unit 601. The window information extracting unit 601 identifies a window in which a reference event occurred. This identification is performed for each of the reference events recorded in the interaction log.

Referring to FIGS. 3 and 5, this identification is performed by examining the "reference event" portion 21 and the "operation object window" portion 26 in the interaction log for each of a plurality of interaction history blocks. The "operation object window" portion 26 is obtained from the recorder 104 through the searching unit 106. The windows identified are posted to a coordinate calculator 604.

A time information extracting unit 602 identifies the time at which the reference events occurred for each of the reference events recorded in the interaction log. This identification is performed by examining the "operation time" portion 27 in the interaction log. The "operation time" portion 27 of each reference event is obtained from the recorder 104 through the searching unit 106. The time identified is posted to the coordinate calculator 604.

The coordinate calculator 604 allocates a position in a screen to each of the reference events. The y-coordinate value of the position of each reference event indicates the window in which the reference event occurred. The x-coordinate value of the position of each reference event indicates the time at which the reference event occurred. The coordinate calculator 604 posts the coordinate values to a graph generator 607.

Referring to FIG. 5, in this exemplary embodiment, the y-coordinate value is calculated so that different windows W1 to W3 have different y-coordinate values. The x-coordinate value is proportional to the time the reference event occurred. Alternatively, the x-coordinate value may be increased by a predetermined value so that positions of the reference events have uniformly spaced x-coordinate values.

Referring again to FIG. 4, the object information extracting apparatus 603 identifies an interactive object which was selected in each of the reference events. The object information extracting apparatus 603 may identify the type of operation performed in each of the reference events. This identification is performed by examining the "selected object" portion 24 in the interaction log. The "selected object" portion 24 of each reference event is obtained from the recorder 104 through the searching unit 106. The object information extracting unit 603 posts the selected objects to a symbol determining unit 605.

The symbol determining unit 605 identifies graphical symbols that represent the selected symbols of the reference events. The graphical symbols representing the interaction objects are stored in symbol recording unit 606. The graphical symbols identified are posted to the graph generator 607.

Referring to FIG. 5, in this exemplary embodiment, a graphical image having a circular shape represents an operation for interactive parts. A graphical image having a triangular shape represents an operation for windows. A graphical image having a square shape represents an operation to input characters.

Referring to FIGS. 4 and 5, the graph generator 607 generates a graphical image by placing the graphical symbol of each reference event at the position of the reference event calculated by the coordinate calculator 604. The graph generator 607 further draws lines connecting adjacent graphical symbols.

Next are described the structure and the operation of a imaging unit 1070 for generating a bar graph.

Figure 6:
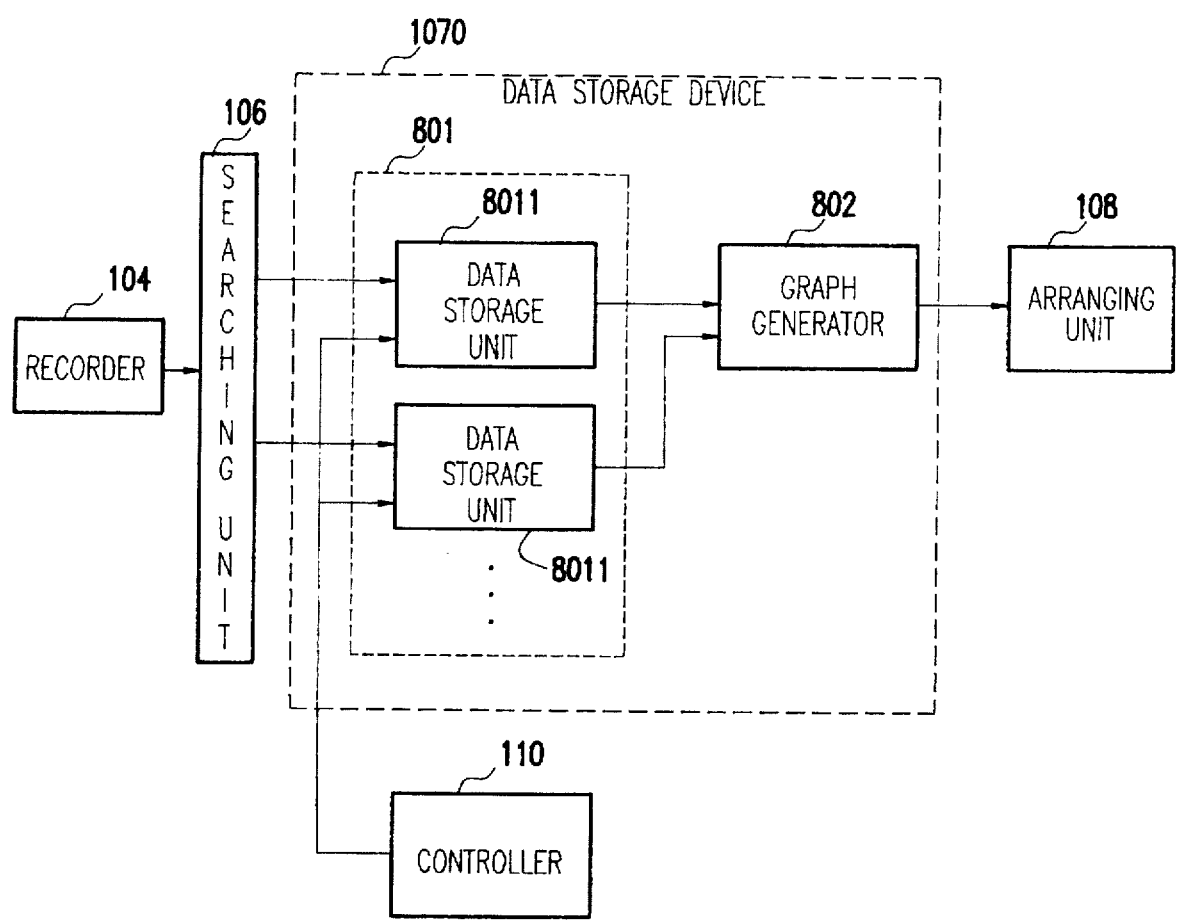
FIG. 6 is a schematic block diagram of another imaging unit 1070.

Referring to FIG. 6, the imaging unit 1070 includes a data storage device 801. The data storage device 801 includes a plurality of data storage units 8011.

When an operator instructs the imaging unit 1071 to generate a bar graph, a reference time is designated by the operator. The reference time is sent to the data storage unit 8011 through the input device 111 and controller 110. The data storage units 8011 calculate the cumulative sum of a "physical event" assigned thereto by accumulating the "physical event" from the beginning of the interaction log recording to the reference time. The calculated cumulative sum is posted to the graph generator 802. For example, the physical events include a cursor travel distance, a window transition number, and an operation time.

The cumulative sum of the cursor travel distance can be is calculated by accumulating the distance between the cursor positions of two contiguous events. The cursor positions are obtained from the "cursor position" portion 22 in the interaction log. The "cursor position" portion 22 is acquired from the recorder 104 through the searching unit 106.

The cumulative sum of the number of the window transitions can be calculated by examining the "operation object window" portions 26 of the two successive reference events. When the "operation object window" portions 26 of the reference events indicate different windows, the cumulative sum is incremented.

Figure 7:
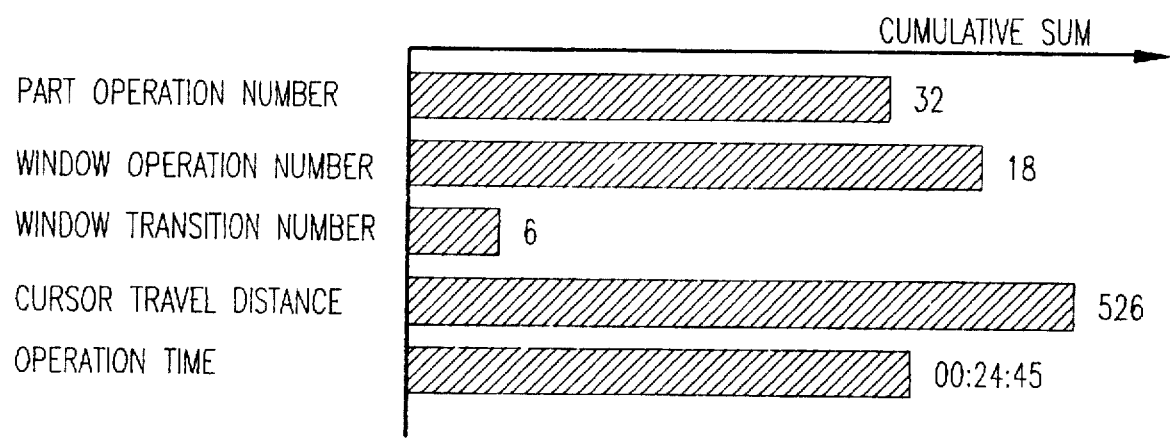
FIG. 7 is an example of an image generated by the imaging unit 1070 shown in FIG. 6.

Referring to FIGS. 6 and 7, the graph generator 802 generates a bar graph referring to the cumulative sums calculated by the data storage units 8011. In this exemplary embodiment, "operation number of interactive part", "window operation number", "window transition number", "cursor travel distance"; and "operation time" are illustrated as bars and numerals on the right side of the bars.

The heights of the bars may be proportional to the cumulative sum. Alternatively, the heights of the bars may be proportional to the ratio between the cumulative sum up to the reference time and that up to the end of the interaction log recording.

Figure 8:
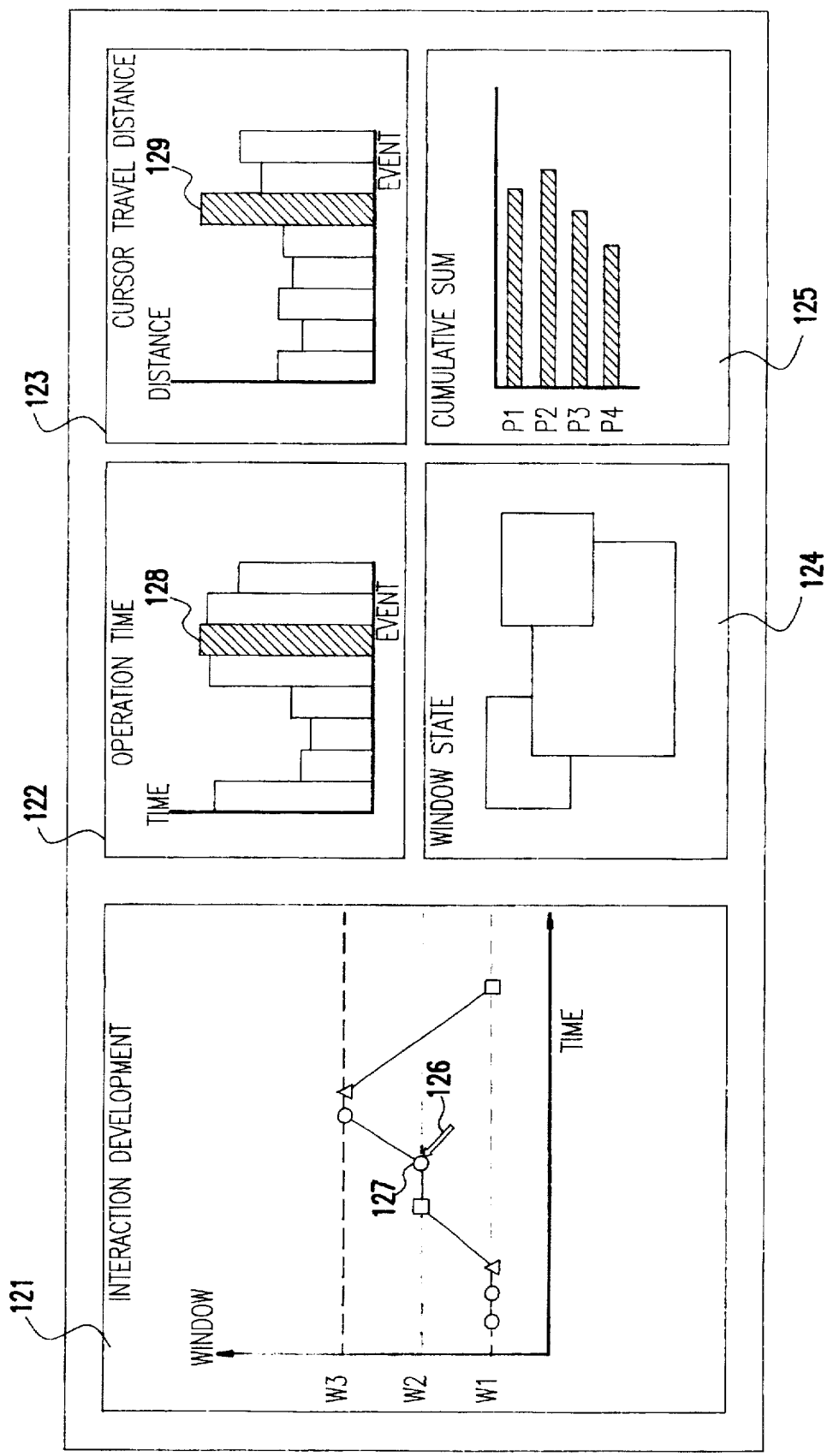
FIG. 8 is an example of an image generated by an arranging unit 108.

Referring to FIGS. 1 and 8, the arranging unit 108 arranges a plurality of images generated by the imaging units 1070 to generate a screen image. The screen image is displayed by the output device 109. In this exemplary embodiment, images 121 to 125 are displayed.

The image 121 is the same kind of graph as shown in FIG. 5.

The image 122 is an "operation time" graph which shows the time intervals between two successive reference events. Specifically, the vertical and horizontal axes represent the time interval and the reference events, respectively.

The image 123 is a "cursor travel distance" graph showing cursor travel distances between two successive reference events. The vertical and horizontal axes represent the cursor travel distances and the reference events, respectively.

The image 124 is a "window state" figure illustrating the positions of the windows and the overlapping conditions of the windows at the reference time.

The image 125 is the same image as that shown in FIG. 7. The images 124 and 125 are not displayed until the reference time is designated by the operator.

Next is described the operation of the controller 110.

Figure 9:
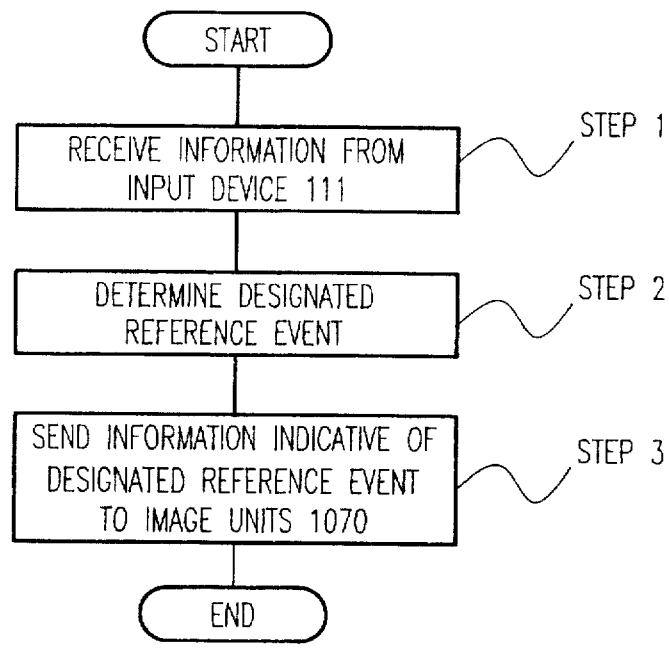
FIG. 9 is a flowchart illustrating the operation of a controller 110.

Referring to FIGS. 8 and 9, in a first step, the operator designates a reference event by using the input device 111. In this exemplary embodiment, the operator places a cursor 126 on an item on the screen (e.g., a graphical symbol in image 121, or a bar of the image 122 and 123, etc.). In this case, the cursor 126 is placed on a graphical symbol 127 of the image 121 and the cursor is actuated via the input device 111. The item designated is posted to the controller 110.

In a second step, the controller 110 determines the reference event that corresponds to the item designated by the operator. This identification is performed by referring to the interaction log stored in the recorder 104 via the searching unit 106.

In a third step, the controller 110 sends information indicative of the designated reference event to the imaging units 1070.

Upon receiving the information, the imaging units generating the images 121, 122, and 123 highlight the graphical items (e.g., a graphical symbol or a bar) which correspond to the reference event designated. In this case, the imaging unit 1070 generating the image 121 highlights the graphical image 127. The imaging unit 1070 generating the image 122 highlights a bar 128 that indicates the operation time of the reference event designated. The imaging unit 1070 generating the image 123 highlights a bar that indicates the cursor travel distance of the reference event designated. The imaging units 1070 may modify (e.g., scrolling or page changing) the image so that the highlighted portion is easy to find.

Upon receiving the information from the controller 110, the imaging unit 1070 for the images 124 and 125 generates the images 124 and 125, respectively. The time at which the designated reference event occurred is used as the reference time. The reference time is acquired from the "operation time" portion 27 of the interaction log.

As stated above, according to the present invention, not only the reference events but also various sorts of interactive state parameters are recorded in synchronization with the occurrence of the reference event. The interactive state parameters make it possible to reproduce the development of user-machine interaction in detail.

The synchronization of the interactive state parameter acquisition is secured by suspending information transmission from the GUI controller 12 to the interaction processing unit 13 with the judging unit 105 and latching unit 103.

The interaction log analyzing device 130 generates a novel figure as shown in FIG. 5. This figure allows the operator to grasp the development of the use-machine interaction easily and quickly.

The controller 110 highlights a plurality of graphical items corresponding to the same reference event designated by the operator. This function makes it possible for the operator to grasp the relationship among a plurality of images generated by the imaging units 1070.

Next is described a second embodiment of the present invention. A key feature of the second embodiment is recording the interaction log only when specific application programs are executed.

Figure 10:
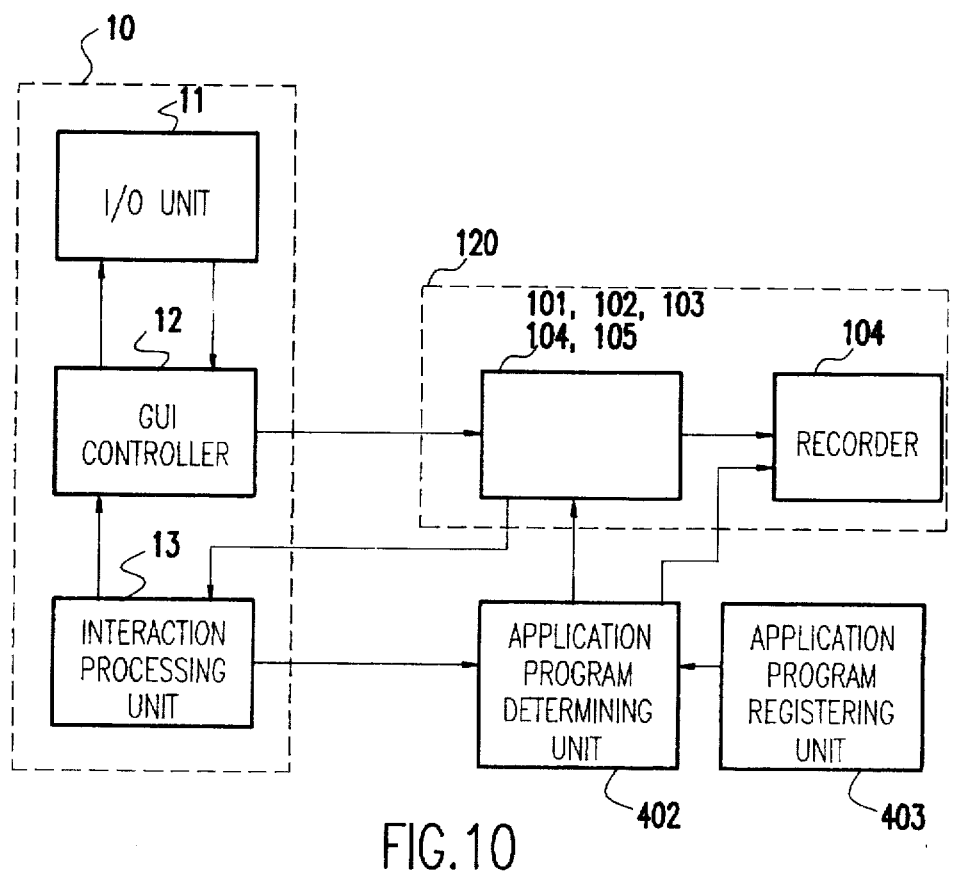
FIG. 10 is a schematic block diagram of a second embodiment of the present invention.

Referring to FIG. 10, the second embodiment includes an application program determining unit 402 and an application program registering unit 403. The application programs whose reference events are to be recorded are registered in the application program registering unit 403. The application program determining unit receives information from the GUI controller 12 or the interaction processing unit 13.

When a reference event occurs, the application program determining unit 402 determines whether the application program being run is registered in the application program registering unit 403. When the application program is registered, the application program determining unit 402 directs the interaction log recording device 120 to record the interaction history block of the reference event. Otherwise, the application program determining unit 402 inhibits the interaction log recording device 120 from recording the interaction history block of the reference event.

The application program determining unit 402 posts the application program being run to the interaction log recording device 120. The interaction log recording device 120 records information (e.g., application program codes) indicative of the application program in the interaction history block. Thus, it is possible to identify the application program that was running when a reference event occurred.

Instead of recording application program codes in the interaction log, the interaction log may be recorded on a application-program-by-application-program basis.

Next is described a third embodiment of the present invention. A key feature of the third embodiment is a method for recording the interaction log.

In the third embodiment, specific kinds of interactive state parameters acquired in synchronization with a reference event is recorded in a interaction history block of the next reference event. Such kinds of interactive state parameters may include, for example, the "windows in screen and positions thereof" portion 25 (hereinafter referred to as "window state parameter")

Figure 11A:
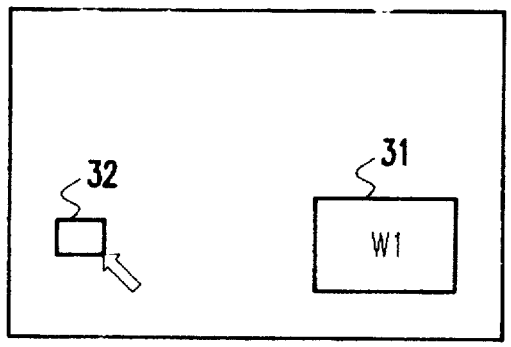
FIGS. 11(a) to 11(d) explain the operation of a second embodiment of the present invention.
Figure 11B:
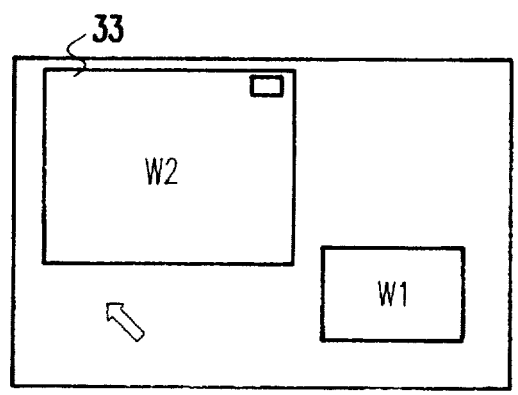

Referring to FIG. 11(a), a window 31 and an icon 32 are positioned on the screen of the input/output unit 11 at a certain time instant. When the operator clicks on the icon 32 so as to open the window 31, this input event is detected as one reference event "event 1" by the event detector 101. The information indicative of the occurrence of event 1 is latched by the latching unit 103. One of the state detecting units 1021 detects the window state parameter in synchronism with the trigger signal issued from the event detector 101.

At this time, since the interactive processing unit 13 has not received the information from the GUI controller 12, the screen state of the input/output unit 11 remains as shown in FIG. 11(a). As a consequence, the state detector 1021 detects the window state parameters of the screen shown in FIG. 11(a). In this case, the state detector 1021 sends a code {W1} indicative of the existence of window W1 to recorder 104.

The recorder 104 records the code {W1} in an interaction history block of a reference event which has occurred just before the window state was detected. Meanwhile, the judging unit 105 produces a trigger signal when the window state parameter has been acquired by the state detector 1021. In response to the trigger signal, the latching unit 103 releases the information latched thereby. The interaction processing unit 13 creates new window W2 in response to the information just released from the latching unit 103. The I/O unit 11 displays the new window W2.

Figure 11C:
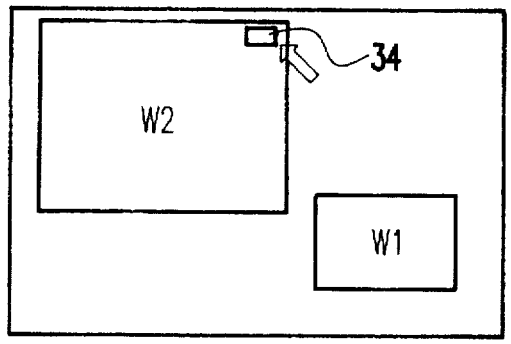

Referring to FIG. 11(c), thereafter, the operator clicks on a box 34 of the window 33 so as to delete the window W2. This event is detected as one reference event "event 2" by the event detector 101. The information indicative of the occurrence of event 2 is latched by the latching unit 103. The state detector 1021 detects the window state parameters of the screen shown in FIG. 11(c). In this case, a code {W1, W2} indicative of the existence of windows W1 and W2 is sent to the recorder 104. The recorder 104 records this code {W1, W2} in the interaction history block of the reference event "event 1" immediately before the "event 2."

As a result, a combination of data items {event 1, W1, W2} is recorded in the interaction history block of event 1. This data item does not represent the screen image at the time when event 1 occurred, but instead represents the screen image after the event 1 is processed. However, this recording format allows the operator to easily understand the relationship between event 1 and the screen image resulting from event 1.

Figure 11D:
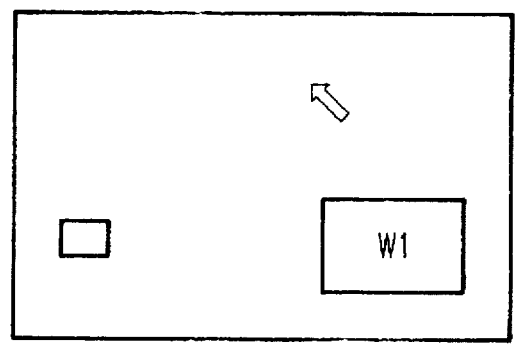

Referring to FIG. 11(d), after the detection of the window state parameters, the latching unit 103 releases the information latched therein. The interaction processing unit 13 removes window W2 in response to the information from the GUI controller 12. When event 3 occurs, a window parameter {W1} is recorded in the interaction history block of event 2. As a result, a combination of data items {event 2, W1} is recorded in the recorder 104.

Next are described fourth and fifth embodiments of the present invention. A key feature of these embodiments is images being generated by the imaging units 1070.

Figure 12A:
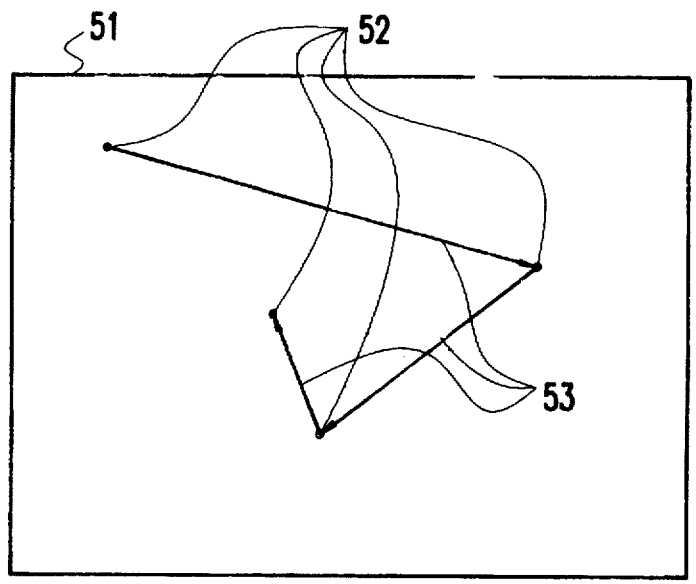
FIGS. 12(a) and 12(b) illustrate images generated by third and fourth embodiments of the present invention, respectively.

Referring to FIG. 12(a), an imaging unit 1070 according to the fourth embodiment generates an image illustrating the traveling path of the cursor. Each node 52 indicates the position at which the cursor was positioned when a reference event occurred. The nodes 52 are connected by vectors 53.

This image allows the operator to easily observe the screen area in which the cursor was frequently moved. This image also allows the operator to visualize cursor movement distances or cursor movement frequencies.

Figure 12B:
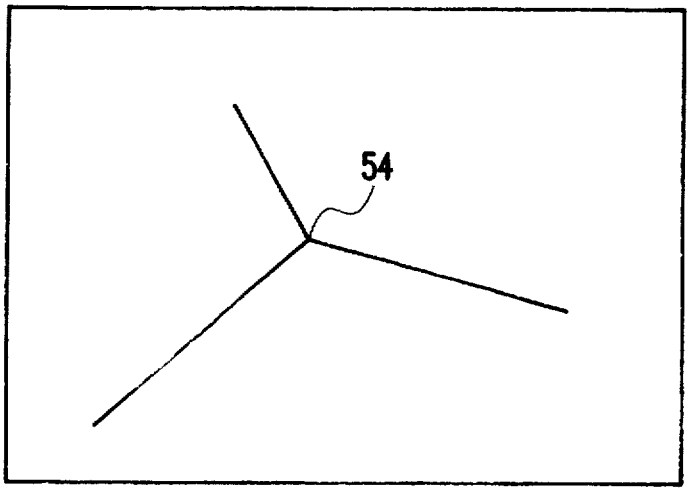

Referring to FIG. 12(b), an imaging unit 1070 according to the fifth embodiment generates an image in which the origins of the vectors 53 coincide with a point 54. This image allows the operator to visualize cursor movement distances and the cursor movement direction in which the cursor is frequently moved.

In the present invention, the interactive system 10, interaction log recording device 120, and the interaction log analyzing device 130 may be implemented by software executed by the same computer.

The interaction log recording device 120 and the interaction log analyzing device 130 also may be implemented by hardware.

The input device 111 and the output device 109 can be implemented by the I/O unit 11.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. An apparatus for recording an interaction log of an interactive system, said interactive system including an input unit and a display unit having windows, said apparatus comprising:

event detecting means for determining whether an event occurred in said interactive system, wherein said event comprises a reference event;

state detecting means for detecting a plurality of parameters indicating a state of said interactive system when said event detecting means determined that said event occurred, wherein said state detecting means detects said parameters in synchronization with an occurrence of said reference event; and recording means for recording said parameters detected by said state detecting means;

wherein, said parameters include at least two of states of objects on said display, a position of said input unit, a time of said event, and states of said windows on said display.

2. An apparatus according to claim 1 wherein said event comprises a reference event, said apparatus further comprising:

latching means for latching information to be transferred from said input unit to said processing unit so that said processing unit is unresponsive to said reference event; and judging means for releasing said information latched by said latching means when said state detecting means completes detection.

3. An apparatus according to claim 2, wherein said apparatus comprises a plurality of state detecting means, and said judging means releases said information latched by said latching means after all of said plurality of state detecting means complete detection.

4. An apparatus according to claim 1, wherein said event comprises a reference event, said apparatus further comprising:

a plurality of imaging units, each of said imaging units generating an image including graphical items corresponding to reference events recorded in said recording means; and a controller for receiving information designating one of said reference events as a selected event, said controller directing said plurality of imaging units to mark a graphical item that corresponds to said selected event.

5. An apparatus according to claim 1, wherein said event comprises a reference event, said apparatus further comprising an imaging unit for generating an image including a graphical item corresponding to one of a plurality of reference events, wherein said imaging unit calculates one of x-coordinate and y-coordinate values of a position of said graphical item according to a window in which the reference event corresponding to said graphical item occurred, and said imaging unit calculates another coordinate value according to a time when the reference event corresponding to said graphical item occurred.

6. An apparatus according to claim 5, wherein said imaging unit generates a different type of graphical symbol as said graphical item according to a type of the reference event corresponding to said graphical item.

7. An apparatus according to claim 1, further comprising an imaging unit for generating an image including a shape whose height represents a cumulative sum of a physical event.

8. An apparatus according to claim 1, wherein said event comprises a reference event, said apparatus further comprising:

an application program registering unit for registering a type of application program whose reference events are to be recorded; and an application program detecting unit for directing said recording means to record said parameters when said reference event was produced by an application program that is registered in said application program registering unit.

9. An apparatus according to claim 1, wherein said event comprises a reference event, and wherein said recording means records a plurality of data blocks each corresponding to one of a plurality of reference events, said recording means recording said parameters which were detected in synchronization with a first reference event into one of said data blocks corresponding to a second reference event which occurred subsequent to said first reference event.

10. An apparatus according to claim 1, further comprising an imaging unit for generating an image including nodes each corresponding to a respective reference event of a plurality of reference events, said imaging unit calculating a position of each node of said nodes according to a cursor position at a time when the respective reference event of said plurality of reference events occurred.

11. An apparatus according to claim 10, wherein said imaging unit generates an image of vectors connecting said nodes.

12. An apparatus according to claim 1, wherein said event comprises a reference event, said apparatus further comprising an imaging unit for generating an image including vectors, each of said vector representing cursor movement between successive ones of reference events, said vectors being positioned so that said vectors have a same origin.

13. A method of recording an interaction log of an interactive system, said interactive system including an input unit, a display having windows, and a processing unit coupled to said display, said method comprising steps of:

(a) determining whether an event occurred in said interactive system, wherein said event comprises a reference event;

(b) detecting a plurality of parameters in synchronization with occurrence of said reference event indicating a state of said interactive system when said event occurred, wherein said parameters include at least two of states of objects on said display, a position of said input unit, a time of said event, and states of said windows on said display; and (c) recording said parameters detected in step (b).

14. A method according to claim 13, wherein said event comprises a reference event, said method further comprising steps of:

(d) latching information to be transferred from said input unit to said processing unit so that said processing unit is unresponsive to said reference event; and (e) releasing said information latched in step (d) when step (b) is completed.

15. A method according to claim 14, wherein step (e) comprises a step of releasing said information latched in step (d) after all of said parameters are detected in step (b).

16. A method according to claim 13, wherein said event comprises a reference event, said method further comprising steps of:

(f) generating a plurality of images, each of said images including graphical items corresponding to reference events recorded in step (c);

(g) receiving information designating one of said reference events as a selected event; and (h) marking one or ones of said graphical items that correspond to said selected event.

17. A method according to claim 13, wherein said event comprises a reference event, said method further comprising a step of:

(i) generating an image including a graphical item corresponding to one of a plurality of reference events, wherein step (i) comprises steps of:

(i-1) calculating one of x-coordinate and y-coordinate values of a position of said graphical item according to a window in which the reference event corresponding to said graphical item occurred; and (i-2) calculating another coordinate value according to a time when the reference event corresponding to said graphical item occurred.

18. A method according to claim 17, wherein step (i) comprises a step of:

(i-3) generating a different type of graphical symbol as said graphical item according to a type of the reference event corresponding to said graphical item.

19. A method according to claim 13, further comprising a step of:

(j) generating an image including a shape whose height represents a cumulative sum of a physical event.

20. A method according to claim 13, wherein said event comprises a reference event, said method further comprising steps of:

(k) registering a type of application program whose reference events are to be recorded; and wherein step (c) comprises a step of:

(l) recording said parameters when said reference event was produced by an application program that is registered in step (k).

21. A method according to claim 13, wherein said event comprises a reference event, wherein step (c) comprises a step of:

(m) recording a plurality of data blocks each corresponding to one of a plurality of reference events, and wherein said step (m) comprises a step of:

(m-1) recording said parameter which was detected in synchronization with a first reference event into one of said data blocks corresponding to a second reference event which occurred subsequent to said first reference event.

22. A method according to claim 13, further comprising steps of:

(n) calculating positions of a plurality of nodes, each node of said plurality of nodes corresponding to a respective reference event of a plurality of reference events according to a cursor position at a time when the respective reference event occurred; and (o) generating an image including said nodes at positions calculated in step (n).

23. A method according to claim 22, wherein step (p) comprises a step of:

(o-1) generating an image including vectors connecting said plurality of nodes.

24. A method according to claim 13, wherein said event comprises a reference event, said method further comprising a step of:

(p) generating an image including vectors, each of said vectors representing cursor movement between successive ones of reference events, said vectors being positioned so that said vectors have a same origin.

* * * * *